US012559830B2

(12) United States Patent
Nishida et al.

(10) Patent No.: US 12,559,830 B2
(45) Date of Patent: Feb. 24, 2026

(54) SURFACE-TREATED STEEL

(71) Applicant: NIPPON STEEL CORPORATION, Tokyo (JP)

(72) Inventors: Yoshikatsu Nishida, Tokyo (JP); Atsuo Shimizu, Tokyo (JP); Shin Ueno, Tokyo (JP); Hiromasa Shoji, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/708,525

(22) PCT Filed: Nov. 22, 2022

(86) PCT No.: PCT/JP2022/043202
§ 371 (c)(1),
(2) Date: May 8, 2024

(87) PCT Pub. No.: WO2023/090458
PCT Pub. Date: May 25, 2023

(65) Prior Publication Data
US 2024/0327969 A1 Oct. 3, 2024

(30) Foreign Application Priority Data
Nov. 22, 2021 (JP) ................................. 2021-189292

(51) Int. Cl.
*C23C 8/52* (2006.01)
*B32B 15/01* (2006.01)
(Continued)

(52) U.S. Cl.
CPC .............. *C23C 8/52* (2013.01); *B32B 15/013* (2013.01); *B32B 15/04* (2013.01); *B32B 15/08* (2013.01);
(Continued)

(58) Field of Classification Search
CPC .... C23C 8/52; C23C 2/06; C23C 2/26; C23C 2/40; C23C 22/36; C23C 22/44;
(Continued)

(56) References Cited

U.S. PATENT DOCUMENTS

2009/0110921 A1 4/2009 Kaneto et al.
2014/0050939 A1 2/2014 Morishita et al.
(Continued)

FOREIGN PATENT DOCUMENTS

JP 4776458 B2 9/2011
JP 5336002 B2 11/2013
(Continued)

*Primary Examiner* — Michael E. La Villa

(74) *Attorney, Agent, or Firm* — Birch, Stewart, Kolasch & Birch, LLP

(57) ABSTRACT

The surface-treated steel includes: a steel; a plated layer containing Zn or a Zn alloy formed on a surface of the steel; and a chemical conversion coating film formed on a surface of the plated layer, wherein the chemical conversion coating film contains an organosilicon compound having a siloxane bond, and P and F, and when the abundance ratio of an alkylene group and a siloxane bond in the organosilicon compound is measured by Fourier transform infrared spectroscopy (FT-IR), a ratio A1/A2 of a peak value A1 of an absorbance at 2,800 to 3,000 cm$^{-1}$ indicating the alkylene group to a peak value A2 of an absorbance at 1,030 to 1,200 cm$^{-1}$ indicating the siloxane bond is 0.10 to 0.75.

3 Claims, 2 Drawing Sheets

(51) Int. Cl.

| | |
|---|---|
| *B32B 15/04* | (2006.01) |
| *B32B 15/08* | (2006.01) |
| *B32B 15/18* | (2006.01) |
| *C23C 2/06* | (2006.01) |
| *C23C 2/26* | (2006.01) |
| *C23C 2/40* | (2006.01) |
| *C23C 18/12* | (2006.01) |
| *C23C 22/36* | (2006.01) |
| *C23C 22/44* | (2006.01) |
| *C23C 28/00* | (2006.01) |
| *C25D 3/22* | (2006.01) |
| *C25D 5/48* | (2006.01) |
| *C25D 5/50* | (2006.01) |

(52) U.S. Cl.
CPC ................ *B32B 15/18* (2013.01); *C23C 2/06* (2013.01); *C23C 2/26* (2013.01); *C23C 2/40* (2013.01); *C23C 18/122* (2013.01); *C23C 22/36* (2013.01); *C23C 22/44* (2013.01); *C23C 28/00* (2013.01); *C25D 3/22* (2013.01); *C25D 5/48* (2013.01); *C25D 5/50* (2013.01); *C23C 2222/20* (2013.01); *Y10T 428/12556* (2015.01); *Y10T 428/12569* (2015.01); *Y10T 428/12799* (2015.01); *Y10T 428/31678* (2015.04)

(58) Field of Classification Search
CPC ... C23C 28/00; C23C 18/122; C23C 2222/20; C25D 3/22; C25D 5/48; C25D 5/05; B32B 15/013; B32B 15/04; B32B 15/08; B32B 15/18; Y10T 428/12556; Y10T 428/12569; Y10T 428/12799; Y10T 428/31678
See application file for complete search history.

(56) References Cited

U.S. PATENT DOCUMENTS

| | | | |
|---|---|---|---|
| 2022/0145473 A1 | 5/2022 | Shoji et al. | |
| 2024/0327969 A1* | 10/2024 | Nishida ................... | C23C 2/40 |

FOREIGN PATENT DOCUMENTS

| | | | |
|---|---|---|---|
| JP | 5933324 B2 | 6/2016 | |
| WO | WO 2020/189769 A1 | 9/2020 | |

* cited by examiner

SURFACE-TREATED STEEL

TECHNICAL FIELD OF THE INVENTION

The present invention relates to a surface-treated steel.

The present application claims priority based on Japanese Patent Application No. 2021-189292 filed in Japan on Nov. 22, 2021, the contents of which are incorporated herein by reference.

RELATED ART

Conventionally, a plated steel sheet (zinc-plated steel sheet) in which a plated layer mainly composed of a zinc is formed on a surface of a steel sheet has been used in a wide range of applications such as automobiles, building materials, and home electric appliances.

In addition, for the purpose of imparting corrosion resistance, paint adhesiveness, and the like to the surface of such a zinc-based plated steel sheet, a method of performing a chromate treatment with a treatment solution containing chromic acid, dichromic acid, or a salt thereof as a main component, a method of performing a treatment using a metal surface treatment agent containing no chromium, a method of performing a phosphate treatment, a method of performing a treatment with a silane coupling agent alone, a method of performing an organic resin coating treatment, and the like are generally known and practically used.

As a technique mainly using a silane coupling agent, for example, Patent Document 1 discloses a chromate-free surface-treated metal material in which an aqueous metal surface treatment agent containing an organosilicon compound (W) obtained by blending two silane coupling agents having a specific structure at a specific mass ratio and a specific inhibitor is applied onto a surface of a metal material and dried to form a composite coating film containing respective components.

In addition, Patent Document 2 discloses a surface-treated metal material subjected to a chromate-free treatment, which is excellent in elements such as corrosion resistance, heat resistance, anti-fingerprint properties, conductivity, coating properties, and black deposition resistance during processing, and a chromium-free metal surface treatment agent used for imparting excellent corrosion resistance and alkali resistance to the metal material.

Patent Document 3 discloses a chromate-free precoated metal sheet including: a metal sheet; and an upper layer coating film (α) formed on at least one surface of the metal sheet, wherein the chromate-free precoated metal sheet has an underlayer treatment layer (β) between the metal sheet and the upper layer coating film (α), and the underlayer treatment layer (β) is formed by blending (1) a film-forming component (X) containing: an organosilicon compound (C) obtained by blending and reacting a silane coupling agent (A) containing an amino group in the molecule and a silane coupling agent (B) containing a glycidyl group in the molecule, wherein the organosilicon compound (C) has a cyclic siloxane bond and a chain siloxane bond in the structure thereof, and the abundance ratio of the cyclic siloxane bond and the chain siloxane bond represented by a ratio [C1/C2] between an absorbance (C1) at 1,090 to 1,100 $cm^{-1}$ indicating the cyclic siloxane bond according to an FT-IR reflection method and an absorbance (C2) at 1,030 to 1,040 $cm^{-1}$ indicating the chain siloxane bond is 0.4 to 2.5; and at least one cationic organic resin (D) selected from a polyurethane resin, a phenol resin, and epoxy resin; and (2) an inhibitor component (Y) containing: at least one metal compound (E) selected from a titanium compound and a zirconium compound; a phosphate compound (J); and a fluorine compound (F), wherein the inhibitor component (Y) need not contain the fluorine compound (F) when the metal compound (E) is a fluorometallic complex compound (E'), thereby adjusting an underlayer treatment agent, and applying and drying the underlayer treatment agent.

CITATION LIST

Patent Document

[Patent Document 1]
Japanese Patent No. 4776458
[Patent Document 2]
Japanese Patent No. 5336002
[Patent Document 3]
Japanese Patent No. 5933324

SUMMARY OF INVENTION

Problems to be Solved by the Invention

The techniques disclosed in Patent Documents 1 and 2 are excellent techniques that have been put to practical use as a surface-treated steel sheet subjected to chromate-free treatment, which is excellent in corrosion resistance, heat resistance, anti-fingerprint properties, conductivity, coating properties, and black deposition resistance during processing.

However, due to recent advancement of customer needs, corrosion resistance (particularly initial white rust resistance) of plating is insufficient in some cases in practical use in the prior art. That is, in the techniques described in Patent Documents 1 and 2, there is a concern that white rust may be generated in the plated layer in a case where the time exceeds the test time in the salt spray test (SST test) which has been generally evaluated so far, or in a worked portion inferior in corrosion resistance to a flat portion (flat surface portion).

In addition, in Patent Document 3, it is necessary to contain an organic resin as a film-forming component. Therefore, even if corrosion resistance and paint adhesiveness are excellent, there is a problem that conductivity is poor.

An object of the present invention is to provide a surface-treated steel excellent in corrosion resistance and conductivity on the premise of a surface-treated steel having a chemical conversion coating film on a surface of a zinc-based plated steel having a plated layer containing zinc or a zinc alloy on a surface of a steel.

Means for Solving the Problem

The corrosion resistance of the surface-treated steel having a chemical conversion coating film is improved as the barrier property (property of blocking permeation of corrosion factors such as moisture and chloride ions) of the chemical conversion coating film is higher. In addition, in a portion where the chemical conversion coating film is damaged due to defects or the like, corrosion resistance is improved as the effect (inhibitor effect) of preventing corrosion of the plated layer due to elution of a substance (mainly a metal element) in the chemical conversion coating film when moisture adheres is higher.

As described above, the chemical conversion coating films disclosed in Patent Documents 1 and 2 are coating films having both the barrier property and the inhibitor effect, but there is a concern that the plated layer may corrode in an environment where higher corrosion resistance than before is required.

In view of such circumstances, the present inventors have studied a method for enhancing the barrier property and the inhibitor effect of a chemical conversion coating film on the premise of a chemical conversion coating film in which inclusion of an organic resin for obtaining excellent conductivity is not essential. As a result, the present inventors have found that the barrier property of the chemical conversion coating film is improved and the corrosion resistance is improved by a chemical conversion coating film that contains an organosilicon compound as a film-forming component and contains P and F as inhibitor components, and controlling the abundance ratio of an alkylene group and a siloxane bond in the organosilicon compound.

As a result of further studies by the present inventors, the present inventors have found that the inhibitor effect is improved and the corrosion resistance is further improved by controlling the abundance ratio of a phosphate group and a siloxane bond in the chemical conversion coating film.

The present invention has been made in view of the above findings. The gist of the present invention is as follows.

[1] A surface-treated steel according to an aspect of the present invention includes: a steel; a plated layer containing Zn or a Zn alloy formed on a surface of the steel; and a chemical conversion coating film formed on a surface of the plated layer, wherein the chemical conversion coating film contains an organosilicon compound having a siloxane bond, and P and F, and when the abundance ratio of an alkylene group and a siloxane bond in the organosilicon compound is measured by Fourier transform infrared spectroscopy (FT-IR), a ratio A1/A2 of a peak value A1 of an absorbance at 2,800 to 3,000 $cm^{-1}$ indicating the alkylene group to a peak value A2 of an absorbance at 1,030 to 1,200 $cm^{-1}$ indicating the siloxane bond is 0.10 to 0.75.

[2] In the surface-treated steel according to [1], when the abundance ratio of a phosphate group in the chemical conversion coating film and the siloxane bond in the organosilicon compound is measured by FT-IR, a ratio A3/A2 of an absorbance A3 of the phosphate group at 1.200 $cm^{-1}$ to the peak value A2 of the absorbance at 1,030 to 1,200 $cm^{-1}$ indicating the siloxane bond may be 0.43 to 1.00.

Effects of the Invention

According to the above-described aspect of the present invention, it is possible to provide a surface-treated steel excellent in corrosion resistance and conductivity.

EMBODIMENT OF THE INVENTION

A surface-treated steel according to an embodiment of the present invention (surface-treated steel according to the present embodiment) is described.

Figure 1:
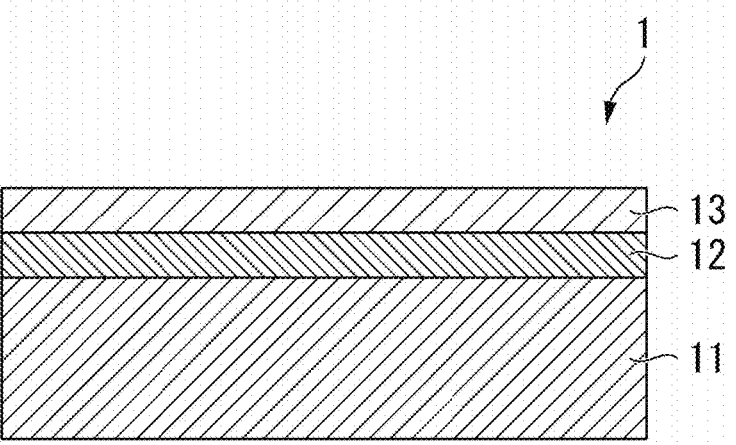
FIG. 1 is a schematic view illustrating an example of a cross section of a surface-treated steel according to the present embodiment.

As illustrated in FIG. 1, a surface-treated steel 1 according to the present embodiment includes a steel 11, a plated layer 12 containing Zn or a Zn alloy formed on a surface of the steel 11, and a chemical conversion coating film 13 formed on a surface of the plated layer 12. In FIG. 1, the plated layer 12 and the chemical conversion coating film 13 are formed only on one surface of the steel 11, but may be formed on both surfaces.

In the surface-treated steel 1 according to the present embodiment, the chemical conversion coating film 13 contains an organosilicon compound having a siloxane bond, and P and F, and when the abundance ratio of an alkylene group and a siloxane bond in the organosilicon compound is measured by FT-IR, the ratio A1/A2 of the peak value A1 of the absorbance at 2,800 to 3,000 $cm^{-1}$ indicating the alkylene group to the peak value A2 of the absorbance at 1,030 to 1,200 $cm^{-1}$ indicating the siloxane bond is 0.10 to 0.75.

Further, preferably, in the surface-treated steel 1 according to the present embodiment, when the abundance ratio of a phosphate group in the chemical conversion coating film 13 and a siloxane bond in the organosilicon compound is measured by FT-IR, the ratio A3/A2 of the absorbance A3 of the phosphate group at 1,200 $cm^{-1}$ to the peak value A2 of the absorbance at 1,030 to 1.200 $cm^{-1}$ indicating the siloxane bond is 0.43 to 1.00.

Hereinafter, the steel 11, the plated layer 12, and the coating film 13 are described.

<Steel>

In the surface-treated steel 1 according to the present embodiment, excellent corrosion resistance can be obtained by the plated layer 12 and the coating film 13. Therefore, the steel 11 is not particularly limited. The steel 11 may be determined by an applied product, required strength, sheet thickness, and the like, and for example, a hot-rolled steel sheet described in JIS G 3193: 2019, JIS G 3131: 2018 or JIS G 3113: 2018, or a cold-rolled steel sheet described in JIS G 3141: 2021 or JIS G 3135: 2018 may be used.

<Plated Layer>

The chemical composition of the plated layer 12 is not limited as long as it is a plated layer (zinc-plated layer) containing Zn or a Zn alloy in an amount of 40 mass % or more. For example, plating specified in JIS G 3313: 2021, JIS G 3302: 2019, JIS G 3323: 2019, JIS G 3317: 2019, or JIS G 3321: 2019 may be applied.

The adhesion amount of the plated layer 12 is not limited, but is preferably 10 $g/m^2$ or more per one surface for improving corrosion resistance. On the other hand, even when the adhesion amount per one surface exceeds 200 $g/m^2$, corrosion resistance is saturated and it is economically disadvantageous. Therefore, the adhesion amount is preferably 200 $g/m^2$ or less.

The type of the plated layer is also not limited. For example, the plated layer may be a hot-dip plated layer or an electroplated layer.

<Coating Film>

[Containing an Organosilicon Compound Having a Siloxane Bond, and P and F]

The chemical conversion coating film 13 included in the surface-treated steel 1 according to the present embodiment is obtained by applying a treatment solution (chemical treatment solution) containing a silane coupling agent, a phosphate compound, and a fluorine compound onto a plated layer containing zinc or a zinc alloy under predetermined conditions and performing drying. Therefore, the chemical conversion coating film 13 included in the surface-treated steel 1 according to the present embodiment contains a silicon compound having a siloxane bond (Si—O—Si bond: including a cyclic siloxane bond and a chain siloxane bond) derived from the silane coupling agent as a film-forming component, and contains P and F as inhibitor components. P and F are considered to exist as inhibitors in a state of a phosphate compound and a fluorine compound.

When the silicon compound is a film-forming component, the average Si concentration of the chemical conversion coating film is, for example, 10 mass % or more. If necessary, the chemical conversion coating film 13 may contain Zr or V derived from a Zr compound or a V compound.

The chemical conversion coating film 13 included in the surface-treated steel 1 according to the present embodiment does not substantially contain an organic resin.

Whether or not the chemical conversion coating film contains P and F is determined by a method of confirming the presence or absence of P and F in the surface-treated steel with an X-ray fluorescence spectrometer. When other elements such as Zr and V are contained, the analysis can be similarly performed. When the detection intensity of each element is three times or more the detection intensity measured using a plated steel having no coating film, it is determined that the element is contained in the coating film.

Whether or not the chemical conversion coating film has an organosilicon compound having a siloxane bond can be determined by FT-IR described later.

[When the abundance ratio of an alkylene group and a siloxane bond in the organosilicon compound is measured by FT-IR, the ratio A1/A2 of the peak value A1 of the absorbance at 2,800 to 3,000 cm$^{-1}$ indicating the alkylene group to the peak value A2 of the absorbance at 1,030 to 1,200 cm$^{-1}$ indicating the siloxane bond is 0.10 to 0.75.]

When the chemical conversion coating film contains an organosilicon compound having a siloxane bond as a film-forming component and contains P (phosphate compound) and F (fluorine compound) as inhibitor components, the barrier property of the chemical conversion coating film is improved and corrosion resistance is improved by controlling the abundance ratio of an alkylene group and a siloxane bond in the organosilicon compound.

Specifically, when the ratio A1/A2 of the peak value A1 of the absorbance at 2,800 to 3,000 cm$^{-1}$ indicating the alkylene group to the peak value A2 of the absorbance at 1,030 to 1,200 cm$^{-1}$ indicating the siloxane bond, as measured by FT-IR, is 0.10 to 0.75, the barrier property of the chemical conversion coating film is improved and corrosion resistance is improved.

When the ratio A1/A2 is more than 0.75, that is, when the proportion of the alkylene group in the organosilicon compound is large, an organic substance remains in the SiOx skeleton, so that corrosion resistance is deteriorated because corrosion factors such as moisture and chloride ions easily permeate through the organic substance. The ratio A1/A2 is preferably 0.60 or less, more preferably 0.55 or less, and still more preferably 0.50 or less.

On the other hand, when the ratio A1/A2 is less than 0.10, that is, when the proportion of the siloxane bond is large, cracking occurs in the chemical conversion coating film, and corrosion resistance is deteriorated. The ratio A1/A2 is preferably 0.15 or more, and more preferably 0.20 or more.

[Preferably, when the abundance ratio of the phosphate group in the chemical conversion coating film and the siloxane bond in the organosilicon compound is measured by FT-IR, the ratio A3/A2 of the absorbance A3 of the phosphate group at 1,200 cm$^{-1}$ to the peak value A2 of the absorbance at 1,030 to 1,200 cm$^{-1}$ indicating the siloxane bond is 0.43 to 1.00.]

In the chemical conversion coating film 13 of the surface-treated steel 1 according to the present embodiment mainly including a SiOx skeleton having a cyclic siloxane bond or a chain siloxane bond and including P such as a phosphate compound and F such as a fluorine compound as inhibitor components, the inhibitor effect is improved by controlling the abundance ratio of the phosphate group in the chemical conversion coating film and the siloxane bond in the organosilicon compound.

Specifically, when the ratio A3/A2 of the absorbance A3 of the phosphate group at 1,200 cm$^{-1}$ to the peak value A2 of the absorbance at 1,030 to 1,200 cm$^{-1}$ indicating the siloxane bond, as measured by FT-IR, is 0.43 to 1.00, an excellent inhibitor effect is obtained and corrosion resistance is further improved.

When the ratio A3/A2 is less than 0.43, the amount of the phosphate compound that becomes an inhibitor is small, so that a sufficient effect cannot be obtained. The ratio A3/A2 is more preferably 0.45 or more, and still more preferably 0.50 or more.

On the other hand, when the ratio A3/A2 exceeds 1.00, the barrier property of the coating film is deteriorated, and corrosion resistance is deteriorated. The ratio A3/A2 is more preferably 0.80 or less, and still more preferably 0.60 or less.

The ratio A1/A2 and the ratio A3/A2 can be obtained by measuring the absorbance of a specific peak in a range corresponding to each of an alkylene group, a siloxane bond, and a phosphate group as described above using a general FT-IR apparatus, obtaining A1, A2, and A3, and then taking the ratio thereof.

In the measurement, specifically, the absorbance at a wavenumber of 800 to 4,000 cm$^{-1}$ is measured, and calculation is performed from the value of each absorbance. In the baseline correction at the time of obtaining the absorbance, the absorbance at 4,000 cm$^{-1}$, 2,400 cm$^{-1}$, 2,100 cm$^{-1}$, and 850 cm$^{-1}$ in the wavenumber of 800 to 4,000 cm$^{-1}$ is corrected to be 0. In FT-IR, measurement conditions are, for example, as follows.

Measurement method: diffuse reflection method or ATR method

Resolution: 4 cm$^{-1}$

Number of scans: 128 times

Measurement atmosphere: the air

The adhesion amount of the chemical conversion coating film 13 is preferably 100 to 2,000 mg/m$^2$. When the adhesion amount is less than 100 mg/m$^2$, a sufficient effect may not be obtained. On the other hand, when the adhesion amount is more than 2.000 mg/m$^2$, the film thickness becomes too thick, and the coating film may be peeled off.

<Manufacturing Method>

Next, a preferred method for manufacturing the surface-treated steel according to the present embodiment is described.

The surface-treated steel according to the present embodiment can obtain the effect as long as it has the above characteristics regardless of the manufacturing method, but the following manufacturing method is preferable because it can be stably manufactured.

That is, the surface-treated steel according to the present embodiment can be manufactured by a manufacturing method including the following steps:

(I) a plating step of forming a plated layer containing Zn or a Zn alloy on a surface of a steel such as a steel sheet;

(II) an application step of applying a chemical treatment solution to the steel having the plated layer; and (III) a drying and cooling step of drying the steel to which the chemical treatment solution has been applied, by heating, and then performing air cooling to form a chemical conversion coating film.

Preferred conditions for each step are described.

[Plating Step]

In the plating step, a steel such as a steel sheet is immersed in a plating bath containing Zn or a Zn alloy, or electroplating is performed to form a plated layer on the surface. The formation of the plated layer is not particularly limited. The plating may be performed by a normal method so that sufficient plating adhesion can be obtained.

Further, the steel sheet to be subjected to the plating step and the method for manufacturing the steel sheet are not limited. As the steel sheet to be immersed in the plating bath, for example, a hot-rolled steel sheet described in JIS G 3193: 2019 or JIS G 3113: 2018 or a cold-rolled steel sheet described in JIS G 3141: 2021 or JIS G 3135: 2018 can be used.

The composition of the plating bath may be adjusted according to the chemical composition of the plated layer to be obtained.

After the steel is pulled up from the plating bath, the adhesion amount of the plated layer can be adjusted by wiping as necessary.

[Application Step]

In the application step, a chemical treatment solution (surface treatment metal agent) containing a silane coupling agent, a phosphate compound, and a fluorine compound is applied to a steel having a plated layer containing Zn or a Zn alloy.

In the application step, the method for applying the surface treatment metal agent is not limited. For example, the surface treatment metal agent can be applied using a roll coater, a bar coater, a spray, or the like.

The silane coupling agent is contained as a film-forming component. As the silane coupling agent, for example, a Si compound obtained by blending a silane coupling agent (X) containing one amino group in the molecule and a silane coupling agent (Y) containing one glycidyl group in the molecule at a solid content concentration ratio (X)/(Y) of 0.5 to 1.7 may also be used.

Examples of the fluorine compound contained in the chemical treatment solution include compounds such as hydrofluoric acid HF, fluoroboric acid $BF_4H$, fluorosilicic acid $H_2SiF_6$, hexafluorozirconic acid $H_2ZrF_6$, and titanium hydrofluoric acid $H_2TiF_6$. The compound may be one type or a combination of two or more types. Among them, hydrofluoric acid is more preferable. When hydrofluoric acid is used, more excellent corrosion resistance and coating properties can be obtained.

The phosphate compound contained in the chemical treatment solution remains as P as an inhibitor component in the chemical conversion coating film. The corrosion resistance of the chemical conversion coating film is improved by P as the inhibitor component.

In the present embodiment, the phosphate compound contained in the chemical treatment solution is not particularly limited, and examples thereof include phosphoric acid, ammonium phosphate, potassium phosphate, and sodium phosphate. Among them, phosphoric acid is more preferable. When phosphoric acid is used, more excellent corrosion resistance can be obtained.

When the chemical treatment solution contains a Zr compound, examples of the Zr compound include ammonium zirconium carbonate, hexafluorozirconic acid, and ammonium hexafluorozirconate.

When the chemical treatment solution contains a V compound, examples of the V compound include vanadium pentoxide $V_2O_5$, metavanadic acid $HVO_3$, ammonium metavanadate, sodium metavanadate, vanadium oxytrichloride $VOCl_3$, vanadium trioxide $V_2O_3$, vanadium dioxide $VO_2$, vanadium oxysulfate $VOSO_4$, vanadium oxyacetylacetonate $VO(OC(=CH_2) CH_2COCH_3)_2$, vanadium acetylacetonate $V(OC(=CH_2)CH_2COCH_3)_3$, vanadium trichloride $VCl_3$, and phosphovanadomolybdic acid. It is also possible to use compounds obtained by reducing a pentavalent vanadium compound to tetravalence to divalence with an organic compound having at least one functional group selected from the group consisting of a hydroxyl group, a carbonyl group, carboxylic acid, a primary to tertiary amino group, an amide group, a phosphate group, and a phosphonic acid group.

[Drying and Cooling Step]

In the drying and cooling step, the steel to which the chemical treatment solution has been applied is dried and baked by heating. After drying, the steel is cooled to room temperature (for example, 20° C.) by air cooling. As a result, a chemical conversion coating film is formed on the surface of the plated layer.

In the case of obtaining the surface-treated steel according to the present embodiment, the peak metal temperature (PMT) (maximum attainment temperature of steel) is set to 155 to 200° C. in the drying and cooling step.

Figure 2:
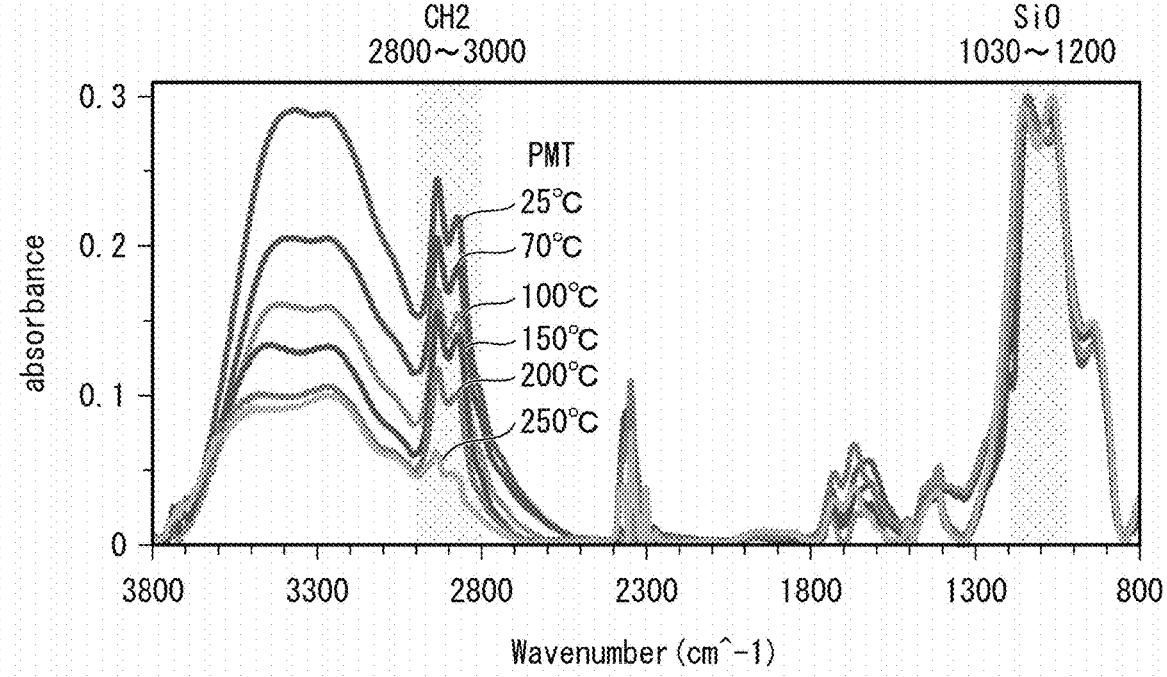
FIG. 2 is a graph showing an analysis result of an ATR method of FT-IR.
Figure 3:
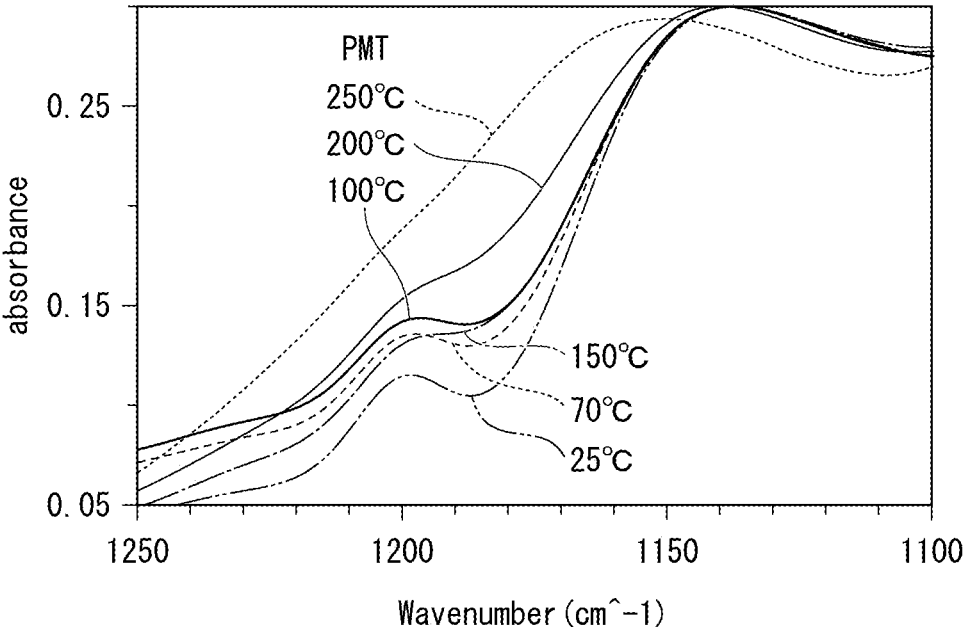
FIG. 3 is a graph showing an analysis result of an ATR method FT-IR.

FIG. 2 is a graph showing an analysis result of an ATR method of FT-IR, and $CH_2$ in FIG. 2 represents an alkylene group and SiO represents a siloxane bond. FIG. 3 is an enlarged graph of a range of a wavenumber of 1,100 to 1,250 $cm^{-1}$ in FIG. 2.

As shown in FIGS. 2 and 3, when the PMT increases, the peak value A2 of the absorbance at 1,030 to 1,200 $cm^{-1}$ indicating the siloxane bond does not change significantly, whereas the peak value A1 of the absorbance at 2.800 to 3,000 $cm^{-1}$ indicating the alkylene group decreases, and the ratio A1/A2 decreases. In order to set the ratio A1/A2 to be in a range of 0.10 to 0.75, the PMT is set to 155 to 200° C.

The heating method is not limited. For example, drying can be performed by heating using IH, a hot blast furnace, or the like. In order to efficiently dry the chemical treatment solution to reduce the ratio A1/A2, it is preferable to use a hot blast furnace, and it is more preferable to blow hot blast to the steel through a punching metal (steel sheet having a plurality of through-holes). By the above method, the flow of hot blast on the surface of the steel becomes complicated, so that the ratio A1/A2 can be efficiently reduced.

At the time of heating, the average temperature rising rate is preferably 4 to 40° C./sec from the viewpoint of productivity and the like.

After the chemical conversion coating film is dried, the surface-treated steel is cooled to room temperature by blowing air (air cooling). By blowing air to the steel having latent heat in the cooling process after drying (after reaching the PMT), the ratio A1/A2 can be efficiently reduced. The air blown at that time is more preferably blown to the steel through a punching metal, similarly to the hot blast in the drying step.

When cooling after drying is performed by water cooling, the amount of heat for forming the SiOx skeleton cannot be obtained, and an alkylene compound remains in the coating film. As a result, the abundance ratio of the alkylene group increases, and the target corrosion resistance (initial white rust resistance) cannot be obtained.

In addition, when water cooling is performed, the inhibitor component is eluted in cooling water. Therefore, in the case of controlling the ratio A3/A2, it is preferable to suppress elution of the inhibitor component by controlling the content of the phosphate compound, and performing cooling after drying by air cooling. When the ratio A3/A2 is controlled, it is preferable that the PMT is set to 160° C. or higher and then the cooling after drying is performed by air cooling.

EXAMPLES

Plated steel sheets (metal sheets Nos. 1 to 8) having plating having a plated layer composition shown in Table 1 were prepared. The adhesion amount of the plated layer was 70 g/m². The metal sheet No. 1 was prepared by electroplating, and the metal sheets Nos. 2 to 8 were prepared by hot-dip plating. In Table 1, for example. Zn-0.2% Al indicates a composition containing 0.2 mass % of Al and the remainder of Zn and impurities. Zn-6% Al-3% Mg indicates a composition containing 6 mass % of Al, 3 mass % of Mg, and the remainder of Zn and impurities, and the same applies to the others.

As a substrate of the plated steel sheet, a cold-rolled steel sheet satisfying JIS G 3141: 2021 was used.

A chemical treatment solution containing: a Si compound obtained by blending at a blending ratio (X/Y) between a silane coupling agent (X) and a silane coupling agent (Y) of 1.0 in terms of the solid content mass ratio; phosphoric acid obtained by blending at a ratio (P/S) between a solid content mass (P) of P derived from phosphoric acid and a solid content mass (Si) of Si derived from a Si compound of 0.2; fluorine-hydrogen acid obtained by blending at a ratio (F/S) between a solid content mass (F) of F derived from fluorine-hydrogen acid and the solid content mass of Si derived from a Si compound of 0.075; and vanadium oxysulfate obtained by blending at a ratio (V/Si) between a solid content mass (V) of V derived from vanadium oxysulfate and a solid content mass of Si derived from a Si compound of 0.075 was applied to the plated steel sheet. The chemical treatment solution was applied with a roll coater.

After the chemical treatment solution was applied, hot blast was blown onto the steel sheet through a punching metal (steel sheet having a plurality of through-holes) to heat the steel sheet to the peak metal temperature (PMT) in Table 2A at a temperature rising rate of 4 to 10° C./sec, and then the steel sheet was cooled to 20° C. by air cooling by blowing air through a punching metal or water cooling. As a result, surface-treated steels Nos. 1 to 21 were obtained. In addition, hot air was blown to the steel sheet without using a punching metal to heat the steel sheet to the peak metal temperature in Table 2A at a temperature rising rate of 8° C./sec, and then air was blown to the steel sheet to air-cool the steel sheet to 20° C. without using a punching metal to obtain surface-treated steels of Nos. 22 and 23.

In addition, a polyurethane resin was allowed to be contained in a treatment solution in which the blending ratio (A)/(B) of 3-aminopropyltrimethoxysilane (A1) as a silane coupling agent (A) containing one amino group to 3-glycidoxypropyltrimethoxysilane as a silane coupling agent (B) containing one glycidyl group in the molecule was 0.5 in terms of the solid content mass ratio, and other compositions were the same as those described above, thereby obtaining a No. 24 surface-treated steel having a coating film containing a polyurethane resin in a weight 0.25 times the weigh of the coating film of No. 2.

TABLE 1

| Metal sheet No. | Plated layer composition (mass %) |
| --- | --- |
| 1 | Zn |
| 2 | Zn-0.2% Al |
| 3 | Zn-6% Al-3% Mg |
| 4 | Zn-11% Al-3% Mg-0.2% Si |
| 5 | Zn-11% Al-3% Mg-0.2% Si-0.05% Ni |
| 6 | Zn-16% Al-6% Mg-0.2% Si |
| 7 | Zn-19% Al-6% Mg-1.5% Sn-0.5% Ca-0.2% Si |
| 8 | Zn-24% Al-12% Mg-0.5% Ca-1.2% Si |

TABLE 2A

| No. | Invention Example or Comparative Example | Metal sheet No. | Coating film adhesion amount (mg/m²) | Resin component in coating film | Peak metal temperature (° C.) | Use of punching metal in blowing hot blast at heating | Cooling method | Use of punching metal in blowing air at cooling |
| --- | --- | --- | --- | --- | --- | --- | --- | --- |
| 1 | Invention Example | 3 | 400 | — | 200 | Yes | Air cooling | Yes |
| 2 | Invention Example | 3 | 400 | — | 170 | Yes | Air cooling | Yes |
| 3 | Invention Example | 3 | 400 | — | 160 | Yes | Air cooling | Yes |
| 4 | Invention Example | 3 | 400 | — | 155 | Yes | Air cooling | Yes |
| 5 | Invention Example | 2 | 400 | — | 155 | Yes | Air cooling | Yes |
| 6 | Invention Example | 4 | 400 | — | 157 | Yes | Air cooling | Yes |
| 7 | Invention Example | 6 | 400 | — | 159 | Yes | Air cooling | Yes |
| 8 | Invention Example | 7 | 400 | — | 165 | Yes | Air cooling | Yes |
| 9 | Invention Example | 8 | 400 | — | 160 | Yes | Air cooling | Yes |
| 10 | Invention Example | 5 | 400 | — | 175 | Yes | Air cooling | Yes |
| 11 | Invention Example | 1 | 400 | — | 162 | Yes | Air cooling | Yes |
| 12 | Comparative Example | 3 | 400 | — | 100 | Yes | Air cooling | Yes |
| 13 | Comparative Example | 3 | 400 | — | 150 | Yes | Water cooling | — |
| 14 | Comparative Example | 4 | 400 | — | 120 | Yes | Air cooling | Yes |
| 15 | Comparative Example | 4 | 400 | — | 120 | Yes | Air cooling | Yes |

TABLE 2A-continued

| No. | Invention Example or Comparative Example | Metal sheet No. | Coating film adhesion amount (mg/m$^2$) | Resin component in coating film | Peak metal temperature (° C.) | Use of punching metal in blowing hot blast at heating | Cooling method | Use of punching metal in blowing air at cooling |
|---|---|---|---|---|---|---|---|---|
| 16 | Comparative Example | 1 | 400 | — | 120 | Yes | Air cooling | Yes |
| 17 | Comparative Example | 1 | 400 | — | 100 | Yes | Air cooling | Yes |
| 18 | Comparative Example | 1 | 400 | — | 140 | Yes | Water cooling | — |
| 19 | Comparative Example | 1 | 400 | — | 170 | Yes | Water cooling | — |
| 20 | Comparative Example | 1 | 400 | — | 250 | Yes | Water cooling | — |
| 21 | Comparative Example | 3 | 400 | — | 300 | Yes | Air cooling | Yes |
| 22 | Comparative Example | 1 | 400 | — | 170 | No | Air cooling | No |
| 23 | Comparative Example | 3 | 400 | — | 200 | No | Air cooling | No |
| 24 | Comparative Example | 3 | 400 | Polyurethane | 170 | Yes | Air cooling | Yes |

TABLE 2B

| | | | Evaluation | | | |
|---|---|---|---|---|---|---|
| No. | A1/A2 | A3/A2 | Corrosion resistance of flat portion I SST190h | Corrosion resistance of flat portion II SST240h | Corrosion resistance of worked portion SST72h | Conductivity Interlayer resistance |
| 1 | 0.24 | 0.53 | S | S | A | A |
| 2 | 0.61 | 0.49 | S | S | A | A |
| 3 | 0.70 | 0.45 | S | S | A | A |
| 4 | 0.73 | 0.41 | S | AA | B | A |
| 5 | 0.73 | 0.41 | S | AA | B | A |
| 6 | 0.70 | 0.42 | S | AA | B | A |
| 7 | 0.70 | 0.42 | S | AA | B | A |
| 8 | 0.68 | 0.46 | S | S | A | A |
| 9 | 0.69 | 0.45 | S | S | A | A |
| 10 | 0.62 | 0.48 | S | S | A | A |
| 11 | 0.67 | 0.45 | S | S | A | A |
| 12 | 0.78 | 0.32 | S | B | C | A |
| 13 | 0.78 | 0.31 | S | B | C | A |
| 14 | 0.84 | 0.41 | AA | B | C | A |
| 15 | 0.83 | 0.40 | AA | B | C | A |
| 16 | 0.76 | 0.42 | AA | B | C | A |
| 17 | 0.77 | 0.29 | AA | C | C | A |
| 18 | 1.10 | 0.31 | AA | C | C | A |
| 19 | 0.90 | 0.33 | AA | C | C | A |
| 20 | 0.80 | 0.36 | AA | C | C | A |
| 21 | 0.09 | 0.32 | AA | C | C | A |
| 22 | 0.79 | 0.39 | S | B | C | A |
| 23 | 0.77 | 0.37 | S | B | C | A |
| 24 | 1.20 | 0.53 | S | S | A | B |

For the obtained surface-treated steels, whether or not the chemical conversion coating film contained an organosilicon compound having a siloxane bond and P and F was confirmed by the above-described method. As a result, in any example, the chemical conversion coating film contained an organosilicon compound having a siloxane bond and P and F.

Further, the ratio A1/A2 and the ratio A3/A2 of the obtained surface-treated steels were measured in the same manner as described above using an ATR method of FT-IR.

The results are shown in Table 2B.

In addition, corrosion resistance was evaluated in the following manner.

<Corrosion Resistance of Flat Portion I>

A flat sheet test piece was subjected to a salt spray test in accordance with JIS Z 2371: 2015 for up to 190 hours, and corrosion resistance was evaluated by the state of white rust generation (area fraction) of the test piece after the test. Evaluation criteria for corrosion resistance are shown below. A case where the evaluation result was S and AA was determined to have sufficient corrosion resistance.
(Evaluation Criteria for Corrosion Resistance)
 S: 1% or less
 AA: more than 1% and 3% or less
 A: more than 3% and 5% or less
 B: more than 5% and 10% or less
 C: more than 10%

<Corrosion Resistance of Flat Portion II>

A flat sheet test piece was subjected to a salt spray test in accordance with JIS Z 2371: 2015 for up to 240 hours, and corrosion resistance was evaluated by the state of white rust generation (area fraction) of the test piece after the test. Evaluation criteria for corrosion resistance are shown below. A case where the evaluation result was S and AA was determined to have sufficient corrosion resistance.

(Evaluation Criteria for Corrosion Resistance)

S: 1% or less
AA: more than 1% and 3% or less
A: more than 3% and 5% or less
B: more than 5% and 10% or less
C: more than 10%

<Corrosion Resistance of Worked Portion>

The center portion of a rectangular test piece (flat sheet) of 70 mm×150 mm was subjected to an Erichsen test (7 mm extrusion), then a salt spray test in accordance with JIS Z 2371: 2015 was performed for 72 hours, and the state of rust generation of the extruded portion was observed. Evaluation was performed using the same evaluation criteria as in the corrosion resistance of flat portion, and a case where the evaluation result was S, AA, A, and B was determined to have sufficient corrosion resistance.

(Evaluation Criteria for Corrosion Resistance)

S: 1% or less
AA: more than 1% and 3% or less
A: more than 3% and 5% or less
B: more than 5% and 10% or less
C: more than 10%

<Conductivity>

Using the method A of JIS C 2550-4: 2011, the interlayer resistance coefficient was measured under the condition that the total area of ten contact electrodes was 1,000 $mm^2$.

A case where the evaluation result was A or more was determined to have sufficient conductivity.

(Evaluation Criteria for Conductivity)

A: interlayer resistance coefficient is less than 300 $\Omega \cdot mm^2$
B: interlayer resistance coefficient is 300 $\Omega \cdot mm^2$ or more As can be seen from Tables 1, 2A, and 2B, in Nos. 1 to 11 as the present invention examples, the chemical conversion coating film contained an organosilicon compound having a siloxane bond, a phosphate compound, and a fluorine compound, and the ratio A1/A2 was 0.10 to 0.75. As a result, not only corrosion resistance of flat portion (corrosion resistance of flat portion I) after the SST test for 190 hours, but also corrosion resistance of flat portion (corrosion resistance of flat portion II) after the test for 240 hours was excellent. In addition, corrosion resistance of worked portion was also excellent.

In particular, in Nos. 1 to 3 and 8 to 11 in which the ratio A3/A2 was 0.43 to 1.00, corrosion resistance of flat portion II was more excellent.

On the other hand, in Nos. 12 and 14 to 17, the peak metal temperature (PMT) was low, and sufficient thermal energy was not obtained, so that the ratio A1/A2 was high. As a result, corrosion resistance of flat portion II and corrosion resistance of worked portion were deteriorated.

In Nos. 13, 19, and 20, water cooling was performed after the formation of the plated layer, and thus the sheet temperature rapidly decreased. Therefore, sufficient thermal energy was not obtained, and thus the ratio A1/A2 was high. As a result, corrosion resistance of flat portion II and corrosion resistance of worked portion were deteriorated.

In No. 18, the peak metal temperature was low and water cooling was performed after the formation of the plated layer, and thus the ratio A1/A2 was high. As a result, corrosion resistance of flat portion II and corrosion resistance of worked portion were deteriorated.

In No. 21, the peak metal temperature (PMT) was high, and the ratio A1/A3 was excessively low. As a result, corrosion resistance was deteriorated.

In Nos. 22 and 23, heating (temperature increase) and air cooling were performed without using a punching metal, and thus the ratio A1/A2 was high. As a result, corrosion resistance of flat portion II and corrosion resistance of worked portion were deteriorated.

In No. 24, the chemical conversion coating film contained a resin component, and the ratio A1/A2 was also out of the scope of the invention. As a result, conductivity was poor.

BRIEF DESCRIPTION OF THE REFERENCE SYMBOLS

1 Surface-treated steel
11 Steel
12 Plated layer
13 Chemical conversion coating film

What is claimed is:

1. A surface-treated steel comprising:
   a steel;
   a plated layer containing Zn or a Zn alloy formed on a surface of the steel; and
   a chemical conversion coating film formed on a surface of the plated layer,
wherein
   the chemical conversion coating film contains P, F, and an organosilicon compound having a siloxane bond,
   an abundance ratio of an alkylene group and the siloxane bond in the organosilicon compound is measured by Fourier transform infrared spectroscopy (FT-IR) at a resolution of 4 $cm^{-1}$ in an air atmosphere, and
   a ratio A1/A2 of a peak value A1 of an absorbance at 2,800 to 3,000 $cm^{-1}$, indicating the alkylene group, to a peak value A2 of an absorbance at 1,030 to 1,200 $cm^{-1}$, indicating the siloxane bond, is 0.10 to 0.75.

2. The surface-treated steel according to claim 1, wherein an abundance ratio of a phosphate group in the chemical conversion coating film and the siloxane bond in the organosilicon compound is measured by FT-IR at a resolution of 4 $cm^{-1}$ in an air atmosphere, and a ratio A3/A2 of an absorbance A3 of the phosphate group at 1,200 $cm^{-1}$ to the peak value A2 of the absorbance at 1,030 to 1,200 $cm^{-1}$, indicating the siloxane bond, is 0.43 to 1.00.

3. The surface-treated steel according to claim 1, wherein an adhesion amount of the plated layer is 10 to 200 $g/m^2$ per one surface and an adhesion amount of the chemical conversion coating film is 100 to 2000 $mg/m^2$ per one surface.

* * * * *